(12) United States Patent
Franklin et al.

(10) Patent No.: US 7,814,213 B2
(45) Date of Patent: *Oct. 12, 2010

(54) ENHANCED DATA EXCHANGE AND PRESENTATION/COMMUNICATION SYSTEM

(75) Inventors: Richard L. Franklin, Madison, AL (US); Robert Cuffe, Madison, AL (US); Willard Case, Madison, AL (US)

(73) Assignee: Comlet Technologies Headquarters, Huntsville, AL (US)

( * ) Notice: Subject to any disclaimer, the term of this patent is extended or adjusted under 35 U.S.C. 154(b) by 204 days.

This patent is subject to a terminal disclaimer.

(21) Appl. No.: 11/980,578

(22) Filed: Oct. 31, 2007

(65) Prior Publication Data

US 2009/0083370 A1 Mar. 26, 2009

Related U.S. Application Data

(63) Continuation of application No. 11/878,226, filed on Jul. 23, 2007, which is a continuation of application No. 09/779,456, filed on Feb. 9, 2001, now Pat. No. 7,249,190.

(51) Int. Cl.
*G06F 15/16* (2006.01)

(52) U.S. Cl. .................. 709/227; 709/201; 709/203; 709/219; 709/228

(58) Field of Classification Search ............ 709/201, 709/209, 219, 227, 228
See application file for complete search history.

(56) References Cited

U.S. PATENT DOCUMENTS

| | | | |
|---|---|---|---|
| 4,799,156 A | 1/1989 | Shavit et al. | |
| 5,630,066 A | 5/1997 | Gosling | |
| 5,692,183 A | 11/1997 | Hapner et al. | |
| 5,701,451 A | 12/1997 | Rogers et al. | |
| 5,754,772 A | 5/1998 | Leaf | |
| 5,758,153 A | 5/1998 | Atsatt et al. | |
| 5,787,019 A | 7/1998 | Knight et al. | |
| 5,793,954 A | 8/1998 | Baker et al. | |
| 5,794,232 A | 8/1998 | Mahlum et al. | |
| 5,809,145 A | 9/1998 | Slik et al. | |
| 5,809,250 A | 9/1998 | Kisor | |
| 5,809,507 A | 9/1998 | Cavanaugh | |
| 5,812,865 A * | 9/1998 | Theimer et al. | 709/228 |
| 5,815,661 A | 9/1998 | Gosling | |
| 5,842,014 A | 11/1998 | Brooks et al. | |
| 5,881,230 A | 3/1999 | Christensen et al. | |
| 5,892,909 A | 4/1999 | Grasso et al. | |
| 5,903,728 A | 5/1999 | Semenzato | |
| 5,913,033 A | 6/1999 | Grout | |
| 5,928,323 A | 7/1999 | Gosling et al. | |
| 5,974,441 A | 10/1999 | Rogers et al. | |

(Continued)

OTHER PUBLICATIONS

International Search Report and Written Opinion dated May 28, 2009 issued in the international Search Report PCT/US08/13230 and Notification of Transmittal of the International Search Report.

(Continued)

*Primary Examiner*—Liangche A Wang
(74) *Attorney, Agent, or Firm*—Venable LLP; Robert S. Babayi

(57) ABSTRACT

A system for establishing a dedicated internet connection between a user and a marketer is described. The connection is initiated by a customer downloading a framework program for a viewer. Thereafter, as content is communicated to the user, it is included with program code used with the framework program to enhance the presentation capabilities of the viewer. More robust presentations are thus enabled over a one-to-one channel.

17 Claims, 13 Drawing Sheets

U.S. PATENT DOCUMENTS

| | | | |
|---|---|---|---|
| 6,041,362 A | 3/2000 | Mears et al. | |
| 6,067,579 A | 5/2000 | Hardman et al. | |
| 6,212,546 B1 | 4/2001 | Starkovich et al. | |
| 6,216,152 B1 | 4/2001 | Wong et al. | |
| 6,295,551 B1 | 9/2001 | Roberts et al. | |
| 6,339,782 B1 | 1/2002 | Gerard et al. | |
| 6,369,821 B2 | 4/2002 | Merrill et al. | |
| 6,397,220 B1 | 5/2002 | Deisinger et al. | |
| 6,446,111 B1 | 9/2002 | Lowery | |
| 6,449,653 B2 | 9/2002 | Klemets et al. | |
| 6,463,445 B1 | 10/2002 | Suzuki et al. | |
| 6,631,396 B2 | 10/2003 | Meyer et al. | |
| 6,654,765 B2 | 11/2003 | Wong et al. | |
| 6,671,800 B1 | 12/2003 | McInally et al. | |
| 6,804,707 B1 | 10/2004 | Ronning | |
| 6,865,715 B2 | 3/2005 | Uchino et al. | |
| 6,874,143 B1 | 3/2005 | Murray et al. | |
| 6,883,168 B1 | 4/2005 | James et al. | |
| 6,920,476 B2 | 7/2005 | McGann et al. | |
| 6,920,567 B1 | 7/2005 | Doherty et al. | |
| 7,000,230 B1 | 2/2006 | Murray et al. | |
| 7,003,546 B1 * | 2/2006 | Cheah | 709/200 |
| 7,003,547 B1 * | 2/2006 | Hubbard | 709/201 |
| 7,069,554 B1 | 6/2006 | Stammers et al. | |
| 7,080,386 B2 | 7/2006 | Thrift et al. | |
| 7,188,186 B1 | 3/2007 | Meyer et al. | |
| 7,197,499 B2 | 3/2007 | Turba et al. | |
| 7,277,911 B2 * | 10/2007 | Cheah | 709/201 |
| 7,293,059 B2 * | 11/2007 | Pearson | 709/201 |
| 7,346,848 B1 | 3/2008 | Ruthfield et al. | |
| 2001/0013068 A1 | 8/2001 | Klemets et al. | |
| 2001/0052034 A1 | 12/2001 | Takimoto | |
| 2002/0019844 A1 * | 2/2002 | Kurowski et al. | 709/201 |
| 2003/0046315 A1 | 3/2003 | Feig | |
| 2006/0271493 A1 | 11/2006 | Stefik et al. | |
| 2007/0208802 A1 | 9/2007 | Barman et al. | |

OTHER PUBLICATIONS

Kuny, Terry (1997) "Push Publishing", National Library of Canada, Information Technology Services, Network Notes #41, ISSN 1201-4338.

Microsoft Corp. Press Release (1996) "Microsoft Leads Industry To Standardize On Formats Of Internet Push Channels; Submits Channel Definition Format Specification To W3C: More Than 30 Leading Companies Rally behind CDF as an Open Industry Specification for Optmizing the "Broadcast" of Information to Millions of Internet Users".

Sigmon, Tim (1997) "The Push of the Internet",Virginia Edu, I, 2.

* cited by examiner

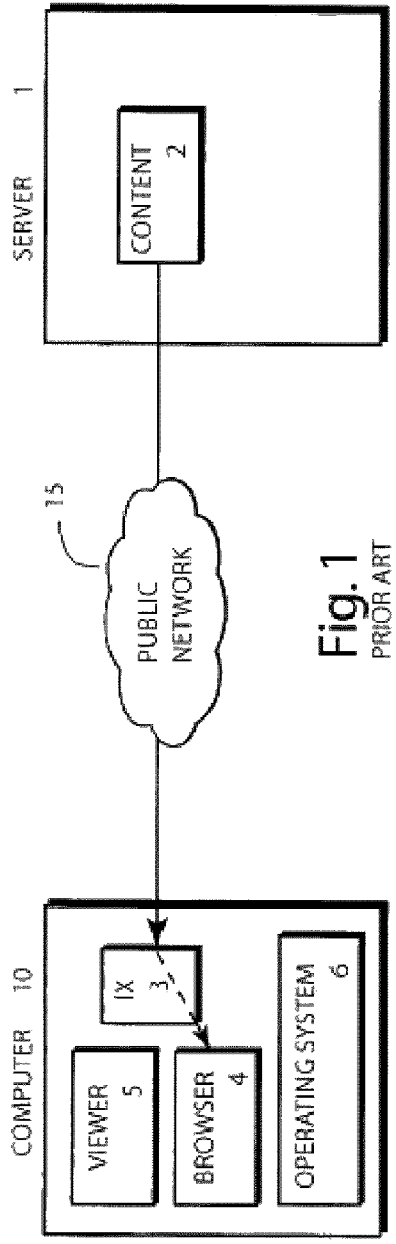
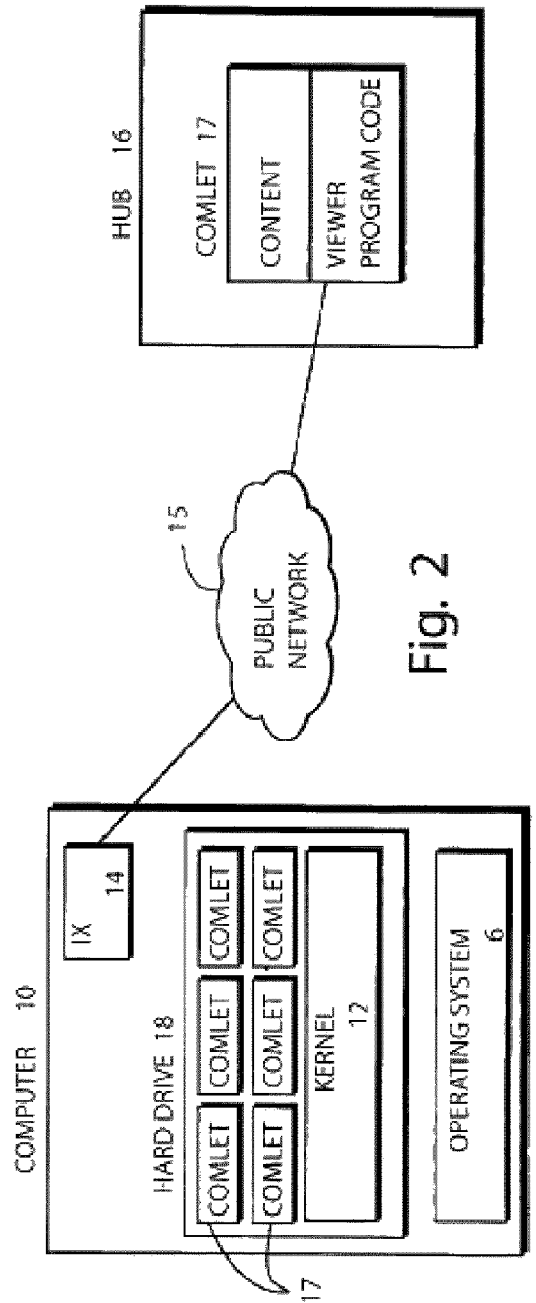

Fig. 12

| | | | |
|---|---|---|---|
| ☐ | Anon: VGNBB | 12/12/2000 | Website |
| ☐ | Anon: FLWIWET | 12/11/2000 | Website |
| ☐ | Anon: 54J4545 | 12/11/2000 | Website |
| ☐ | Anon: 5J45J5 | 12/10/2000 | Website |
| ☐ | Anon: # | 12/10/2000 | Website |
| ☐ | Anon: asdfj | 12/10/2000 | Website |
| ☐ | Anon: QQQ | 12/10/2000 | Website |
| ☐ | Anon: ASDDTE | 12/9/2000 | Website |
| ☐ | Anon: HEWEFG | 12/9/2000 | Website |
| ☐ | Anon: POL | 12/9/2000 | Website |
| ☐ | Anon: YIRE | 12/9/2000 | Website |
| ☐ | Anon: ASDESDF | 12/8/2000 | Website |
| ☐ | Anon: PWLF | 12/8/2000 | Website |
| ☐ | Anon: GREG | 12/8/2000 | Website |
| ☐ | Anon: IRF | 12/7/2000 | Website |
| ☐ | Anon: HBH | 12/7/2000 | Website |
| ☐ | Anon: JJJ | 12/6/2000 | Website |
| ☐ | Anon: GEDW | 12/6/2000 | Website |
| ☐ | Anon: HYH | 12/5/2000 | Website |
| ☐ | Anon: DFG | 12/5/2000 | Website |
| ☐ | Anon: FEEE2 | 12/5/2000 | Website |
| ☐ | Anon: FLWEELE | 12/4/2000 | Website |
| ☐ | Anon: EYEWEB | 12/4/2000 | Website |
| ☐ | Anon: JOHN SMITH | 12/4/2000 | Website |

Clear checkboxes
Groups                    Back to top

Fig. 13

ENHANCED DATA EXCHANGE AND PRESENTATION/COMMUNICATION SYSTEM

CROSS-REFERENCE TO RELATED APPLICATIONS

This application is a continuation of U.S. Non provisional application Ser. No. 11/878,226, filed Jul. 23, 2007, which is a continuation of U.S. Non provisional application Ser. No. 09/779,456, filed Feb. 9, 2001 (issued as U.S. Pat. No. 7,249, 190).

FIELD OF THE INVENTION

This invention relates to the dedicated exchange of electronic media between two parties. This media exchange and presentation/communication system integrates and enhances different types of media before delivering it to the intended party via the Internet.

BACKGROUND AND SUMMARY OF THE INVENTION

As is now known, the Internet provides an extraordinary opportunity for exchange of information. The largest and most visible system is the use of web sites. People around the world who can access the Internet and who have a web browser can access and view information on almost any topic via a web site. This information can be rich in content such as text, graphics, photography, audio, video, etc.

The problem with these web site browsers is they do not all support the same rich content. For example, Microsoft MSN does not support advanced JAVA script but Netscape does. Therefore, if a web site has content using advanced JAVA script, it cannot be seen as intended on an MSN system.

Another issue with web site browsers, even from the same company, is that they are constantly updated with new features under new versions. Data designed using these new features cannot be seen on older versions.

With controlled access sites, data can be sorted and filtered even down to an individual's personal preference or profile. Again, the information comes from a large database that was programmed or posted in the public system for viewing. The web site is basically filtering and delivering a subset of that pre-programmed information to the individual.

E-mail via the Internet is also a known means of exchanging information. E-mail employs a public distribution system designed to deliver information to an individual or group which works very much like the public postal system. People on an e-mail system can send a message to almost anyone, if they know or can find out their e-mail address.

There are numerous e-mail systems available, such as Microsoft® Outlook Express, America Online, Netscape, etc. E-mail is designed to deliver common text messages and attachments within an agreed-upon protocol. Attachments are typically used to send non-text data to recipients. However, this information can only be viewed if the recipient has the software to open the file format.

Some e-mail systems are now providing advanced features for sending photographs, voice messages and even HTML content. Most of the time these more advanced capabilities are difficult to use, and are therefore, seldomly used. In addition, because these advanced capabilities are not built by standardized, system-wide protocols, they are not supported on other e-mail systems. The recipient then sees a file that is reduced back to simple text.

There is another system supported on the Internet that is commonly referred to as network conferencing. These systems support a dedicated channel between one-to-one nor one-to-many parties via the Internet. In a net conference, parties in different locations can exchange multiple types of data in a real-time environment. They support voice exchange, live video, and the ability to view and change common data that is being displayed on all computer screens involved in the conference. These systems require a strict compatibility of software brand and version on all machines involved in the conference.

Internet web sites, e-mail and network conferencing systems work well for their intended use. On Internet web sites and e-mail systems, information is created and formatted and is then posted or sent to either a targeted or non-targeted audience. Network conferencing systems are useful for targeted situations and real-time exchange of information created during or before the conference begins. These systems fall short when they try to do each other's functions or work outside their intended use.

The present invention addresses many of the shortcomings expressed above, especially when users of the traditional systems attempt to deliver high quality presentations/communications information over the Internet.

This invention is designed to encourage the exchange of rich multimedia presentations/communications via a dedicated Internet pipeline between agreeable parties. Information is exclusively exchanged between these parties and outside parties cannot input information into this pipeline without explicit permission. The only exception to this rule is with a hub computer, which sites in the middle of the pipeline to collect different types of data. It also manages data exchange between the parties, combines different types of data, and even enhances the data for a richer presentation/communication.

In a preferred embodiment, the primary party providing information initiates an encounter with another party who would like to carry on an exchange of information via this dedicated Internet pipeline. In a direct exchange, the primary provides the receiving party with the software to begin the exclusive exchange of information. The software can be delivered by giving the person a CD/DVD, a floppy disk, an e-mail with the software attached, a web site location for the download, etc. In alternative embodiments, the receiving party subscribes to the presentation/communication system by initiating an encounter with the primary party after stumbling upon a web site, receiving a direct e-mail, etc. In either embodiment, the receiving party makes the initial decision to install an executable file onto the computer desktop to begin the communication exchange.

Once the receiving party selects to install the software, regardless of how it was obtained, the executable file performs a number of initial installation functions. It establishes a dedicated pipeline for information exchange, enables a scheduling function, and pulls down introductory information from the Hub.

First, the executable file loads a customized minimum framework for executing a viewer-type interface into the receiving party's computer memory (for example, the hard drive). The executable file also locates the receiving party's Internet connection (for example, an America Online connection, MSN connection, LAN connection, etc.) or a pre-defined Internet connection. It then links the receiving party's viewer to the hub via the Internet on a dedicated URL associated with the Hub.

In addition to the viewer, an entry (a unique identifier) is automatically made into a database on the hub that links the two parties for exclusive data exchange via this newly established pipeline. This pipeline will now download an introduction to the receiving party's computer. At the same time the primary party is notified that the receiving party has installed the software and the dedicated pipeline is established.

A scheduling program is then enabled that will later wake up the viewer and perform a two-way data exchange with the hub. All new information from the primary party is downloaded at that time, and information from the receiving party is uploaded.

Finally, the executable program creates a desktop icon on the receiving party's computer. The icon sends an alarm (flashing or audio) to the receiving party anytime new information is downloaded to their computer hard disk. Therefore, at any time, the receiving party can click on the icon and instantly view large, sophisticated and rich multimedia presentations/communications from the hard disk.

When the program assigns the receiving party a unique identifier, the hub will recognize the identifier and deliver to the party whatever appropriate files are awaiting the party. Any time after the pipeline is established, the primary party can interact with the hub to schedule and/or create information for distribution. The hub will take different data types (such as jpg images, sound files, i/o programs, etc.) and combine them with the display code into a single file that can be viewed on the receiving party's computer. Integrating the different types of data and combining them with the display code is done through a number of different programs called "TransLets" (Translation Applications). The resulting output file from a TransLet is a "ComLet" (Communication Applications) which is downloaded to the receiving party's computer. This information will be transferred to the receiving party's computer automatically by the scheduler at specified intervals. Two-way information can also be exchanged through the hub by using the scheduler or by directly clicking the transfer icon.

Although the particular kind of interaction between the parties can vary widely and remain within the scope of the present invention, the present system in essence establishes a dedicated communication link between the parties using the Internet as a delivery conduit. This system allows for robust multimedia presentations/communications to be enhanced and exchanged.

As a further aspect of the present invention, the viewer residing on the recipient's desktop, acts as a light framework for the execution of program files that are downloaded from the hub. The viewer can thus be viewed as a kernel which provides core viewer functions made complete by a program received (ComLet) from the hub. The kernel is thus completely unlike a classic Internet browser which receives only content to be displayed via the established browser protocol. On the other hand, the present viewer kernel becomes a completely different viewer media depending on whatever program routines are pulled from the hub to the viewer. This also eliminates any problem with incompatible viewers or out-of-sink (sp? sync) versions because all of the data critical display information is delivered in the ComLet.

Thus, the present kernel with one routine (ComLet) is a completely different program than the kernel with a newly sent routine (ComLet). In other words, the kernel acts as a framework by which program routines can be sent from the hub to the user for varied and robust presentation.

DETAILED DESCRIPTION OF THE DRAWINGS

These, as well as other objects and advantages of this invention, will be more completely understood and appreciated by careful study of the following more detailed description of a presently preferred exemplary embodiment of the invention taken in conjunction with the accompany drawings, of which:

FIG. 1 is a schematic representation of a prior art content delivery system;

FIG. 2 is a content delivery system in accordance with an example embodiment of the present invention;

FIGS. 11 through 14 are client screens within the command center of, for example, FIG. 10.

DETAILED DESCRIPTION OF THE PRESENTLY PREFERRED EMBODIMENT

Figure 3:
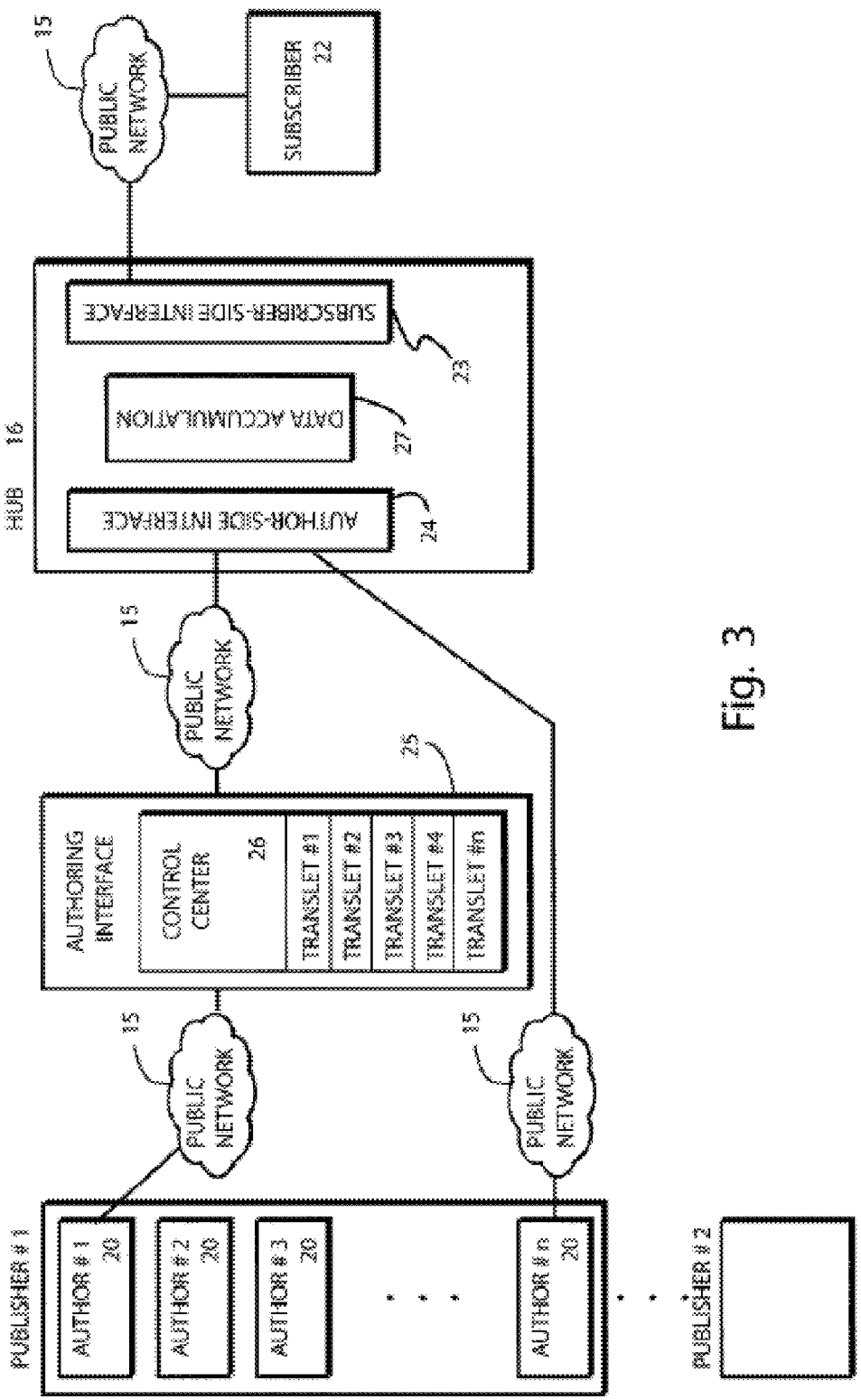
FIG. 3 is a schematic representation of an example content delivery system in accordance with the present invention.

The preferred embodiment of the present invention provides a direct link between two parties on a public network, enabling a business-to-consumer communication in which the consumer receives very high resolution images and product presentations that he or she requests, without encountering typical problems associated with the Internet including the receipt of unwanted messages, viruses, etc. In the preferred embodiment, a consumer gives initial permission for the present invention to be loaded onto the desktop of the user's computer, by for example, running a CD, downloading an Internet file, downloading an e-mail application, etc. Thereafter, when the user clicks on an icon located on the desktop, the user receives very high resolution images and product presentations that have been pre-selected for the user by a business entity. The present invention provides substantially improved levels of communication between businesses and potential/existing customers, while giving the consumer the freedom to engage themselves in the marketing environment at their leisure (as consumers have become accustomed to doing on the Internet).

The present invention is substantially improved over traditional e-mail systems because it establishes a dedicated link between the consumer and the business. Traditional e-mail has become a large junk-mail box, filled with unwanted and many times undesirable messages. Because e-mail is a free service, it is open for anyone to send anything to anyone else (including viruses). The ability to use e-mail as a dialog mechanism between a consumer and a business which have previously determined that they want to engage in business or marketing exercises is a poor choice due to the saturation of the e-mail environment. Further, e-mail is limited as a medium because it delivers simple text messages. Although some computer savvy individuals have employed the e-mail environment to produce quality multi-media presentations, those users are constrained by the computer configurations and program versions that exist on their recipient's computers. Generally, in such cases people use executable files to deliver quality presentations through e-mail, but the files are lengthy, are limited to applications (and application versions) on the computer that can read them, frequently contain viruses and other undesirable material, etc. As a result, users are understandably apprehensive about opening such e-mails.

The World Wide Web compensates for many of e-mail's shortcomings. On the web, one can find information on almost any topic, even in the form of impressive multi-media presentations. As with e-mail, however, a person must have a reasonable knowledge of computer programming and an artistic flare in order to create and deliver an impressive presentation on the web. Although authoring tools exist that make it easier for individuals to develop web sites, web site building is a skill that the average person does not possess. Furthermore, web sites do not lend themselves to customization for individual consumers, but instead transmit information on a one-to-many model.

The present invention provides a one-to-one dialog that provides high quality media presentations to the user via the public network, but utilizes a dedicated channel to provide it. As shown in FIG. 1, the prior art user computer will employ an operating system 6 with a browser 4, an Internet connection (IX), a viewer application associated with the browser. When the user of the user computer desires content from a server 2 on the Internet, the browser requests the content file 1 and the server 2 delivers the content file through the Internet connection 3 to the browser of the user computer. In the embodiment of FIG. 1, the content file 1 must follow a format that is understandable by the browser. That is, the browser 4 provides all of the executable files necessary to create a viewing environment for the user, and simply needs the data content desired to be displayed. Of course, different types of content formats can be viewed at the user computer by installing viewer plug-ins 5 of various application types. Each viewer plug-in is able to render one or more different types of content in particular formats.

On the other hand, the present invention is a completely different methodology of viewing content from the Internet. As shown in FIG. 2, the computer 10 has a standard operating system 11, a standard Internet connection 14 providing Internet connectivity to the Internet 15, and (optionally) a standard browser 13. In accordance with this example embodiment, a kernel program 12 provides a base level framework for creating high quality multimedia presentations on the monitor associated with the computer 10. The kernel itself is not a complete viewer program, but will only be completed when it receives executable program code from the hub 16 in accordance with the descriptions that follow.

The hub 16 creates so-called comlets which consist of content data together with executable program codes. The comlet 17 is thus much more than a simple content package like that shown in FIG. 1 since it contains not only data for display, but includes a completion of the code itself needed to create the viewer environment on which the content will be displayed.

Once the comlet 17 is communicated by the hub 16 through the Internet 15 to the computer 10, it is executed in the kernel 12 in order to create the full viewing multimedia environment on the user monitor associated with the computer 10. As can be seen in a comparison of FIGS. 1 and 2, the computer 10 in accordance with the example embodiment described does not have a viewer resident. This is advantageous because eliminating the viewer on the computer eliminates the constraint that the content provided must conform with the protocols and formats understandable by the viewer. In the example embodiment, the kernel 12 need never understand the format, protocol, etc. of the content of the comlet 17 because the executable files being delivered with the content in the comlet 17 will execute on the content data independently of the kernel operations at the computer 10.

Thus, one can envision the kernel 12 as a core viewer functionality (i.e., setting the stage for the creation of a viewer), which core functions are then modified, enhanced, rewritten, etc. as necessary by the program code in the comlet 17. The comlets 17 that are downloaded are themselves partial programs (akin to an .EXE file that may also require one or more .DLL files which are executable by the computer 10 in the context of the framework of the kernel 12. By analogy, the kernel 12 is akin to the .DLL file that allows the comlet (.exe) program to run. One can thus see that the capabilities of the computer 10 to create the multimedia presentations for the subscriber are no longer constrained by the capabilities of a standard Internet viewer or browser. Since the kernel 12 provides only the framework by which the comlet code will be executed, there are no longer any viewer capabilities, file capabilities, etc. which constrain the operation of the viewer that is ultimately written by the comlet execution.

The invention of FIG. 2 thus operates substantially differently than the prior art of FIG. 1. In the prior art of FIG. 1, the browser understands only a fixed protocol (for example ASCII, HTML, JAVA, etc.) and outside that protocol it will not work. Further, the browser cannot extend itself with new capabilities, but is limited to the capabilities programmed into it. Of course, one can download a new browser or an updated browser program into the user computer via the Internet from a browser provider, but the new browser will suffer the same problems in that it cannot perform outside of its fixed specifications and capabilities.

The general operation of the kernel 12 will now be described. As shown in FIG. 2, the kernel 12 and appropriate comlets 17 are resident on the hard drive 18 of computer 10. During the installation process, the kernel 12 connects to the Internet 15 (via the Internet connection 14), establishes a unique subscriber ID (cookie) from the hub 16, and then downloads some default "welcome" comlets 17 onto the hard drive 18. It then disconnects from the hub 16 and runs the viewer created by operation of the kernel 12 in conjunction with one of the downloaded comlet 17.

Unlike a traditional browser 4, the present user does not connect to the Internet by invoking the viewer. He simply runs the viewer from the hard drive and is able to browse comlets already on the computer.

New comlets are loaded onto hard drive 18 by one of two operations. First, the user can explicitly request new content by clicking on an update button contained on the viewer frame. Then, an Internet connection is created if necessary, causing the kernel to request new content (if any) from the hub. Also, the kernel runs a background daemon that checks for periods of inactivity, and then periodically automatically connects to the hub to see if any new comlets are available for the user. The idea is to not make the user wait, but have new content preloaded before he sits down at the computer.

Therefore there are three unique times when the kernel 12 connects to the Internet 15: 1) during the installation process to obtain a unique subscriber ID, 2) at the request of a user while he is running the viewer, and 3) at the request of the daemon at a predefined time to check for new content.

The viewer created by the kernel 12 in conjunction with any of the comlets 17 is commercially and herein referred to as the BeeZip viewer. With the BeeZip viewer of FIG. 2, the kernel 12 is a lightweight framework for the content 17 to express itself by whatever protocols and whatever instructions are provided in the program code associated within the comlet 17. The comlet 17 is thus adding code (executable programs) to the kernel 12, which codes will be routines that the kernel 12 uses to extend its own capabilities beyond that which were otherwise programmed into it. Thus, each comlet 17 not only defines its own content, but also the presentation by which the content will be rendered. In some instances, the content and viewer program code in the comlet 17 will be a complete software viewer program in and of itself such that when new comlets 17 are provided by the hub 16, the kernel 12 can create a wholly different viewer than was previously rendered.

The comlets 17 are creative in and of themselves, but they become even more useful within the context of the system of FIG. 3. FIG. 3 illustrates a system of three Internet entity types: authors 20 which will typically be employees of a publisher (i.e., any business entity or other entity), the hub 16 (see FIG. 2), and the subscriber 22 (who will be working typically on the user computer 10 of FIG. 2). The BeeZip viewer described previously with respect to FIG. 2 will ultimately exist on the subscriber 22 computer. The BeeZip viewer supports a wide variety of media, including high-quality graphics, photographs, e-mail, music, voice messages, video, interactive programs, etc., all depending solely upon the type of viewer program code provided in the comlet 17 delivered by the hub 16. Also, for each publisher, a different kernel might be installed on the associated subscribers' computers. The kernels are stored in different folders, and are completely independent of each other both functionally and conceptually. Each kernel has an embedded knowledge of the business entity is to communicate with. Although only one hub 16 is shown in FIG. 3, many hubs can be employed. Each business can operate on different or common hubs. Each business has a UNIQUE url that identifies it to whichever hub(s) it is employing. The aspects of the viewer on the subscriber 22 computer 10 are shown in greater detail, for example, in FIGS. 5-9.

A further entity of the system of FIG. 3 is the Authoring Interface 25, which may be separate as shown in FIG. 3 or may be an application resident at the publisher, author 20, or hub 16. The author interface coordinates the translation of raw information from the authors 20 into comlets 17 via appropriate translet routines. The authoring facility further includes a control center 26 which coordinates the submission and distribution of comlets to/from appropriate subscribers 22.

The hub 16 includes a subscriber interface 23 which interacts with the various subscribers 22, usually by the Internet. Although the subscriber interface 23 communicates with the subscribers 22 typically through a public network, such as the Internet, subscriber interface 23 establishes a dedicated communication link with the subscriber 22 as a result of the unique operation of the example embodiment.

That operation begins with the subscriber 22 voluntarily electing to create the dedicated connection to an author (actually to the hub 16 but from the subscribers' perspective, to the author).

The installation sequence takes place as follows:

1) the kernel copies program files to the hard disk.

2) An icon is placed on the desktop.

3) A connection to the Internet is established.

4) A Unique Subscriber ID is obtained from the hub given from the kernel's embedded URL.

5) A set of default comlets (generally "welcome" comlets) are downloaded to the user's machine.

6) The connection is dropped if necessary (like a dialup).

7) The connection scheduling daemon is started (invisible to the user). It is restarted at each boot-up (invisible to the user).

8) Upon user selection, the viewer is started and shows the comlets that are available to browse.

After the installation, the user should notice that every once in a while (hopefully every day or two), the desktop icon shows that new content has arrived. By clicking on the icon, new content is available for browsing. The user can also manually check for new content if he suspects he has new content ready for him.

The creation of the dedicated channel can be described in an example such as where a realtor makes a personal contact with a potential homebuyer and thereafter wishes to maintain close communication with the prospect within the example system. In such a case, the realtor may hand the subscriber 22 a CD that has an executable file associated with the example embodiment of the present invention. When the subscriber 22 runs the CD in the computer 10, the computer is instructed to perform the above-described tasks.

When the subscriber clicks on the icon, the viewer (from the hard drive kernel and welcome comlets) appears. From the subscriber's viewpoint, the subscriber has simply clicked on a logo and instantly entered a viewer environment associated with the entity whose logo was on the subscriber's desktop even though the user does not necessarily have an instant/active connection to the Internet. Thus, it appears to the subscriber that the subscriber has initiated a direct business-to-consumer contact between the business entity and the subscriber. In reality, however, the kernel 12 previously communicated with the hub 16, which has made the appropriate identifications of the subscriber and the publisher/author initiator so as to return the appropriate content to the subscriber 22 in accordance with the logo selected, loaded comlets onto the hard drive and ran the kernel/comlets upon initiation by the subscriber 22.

Figure 4:
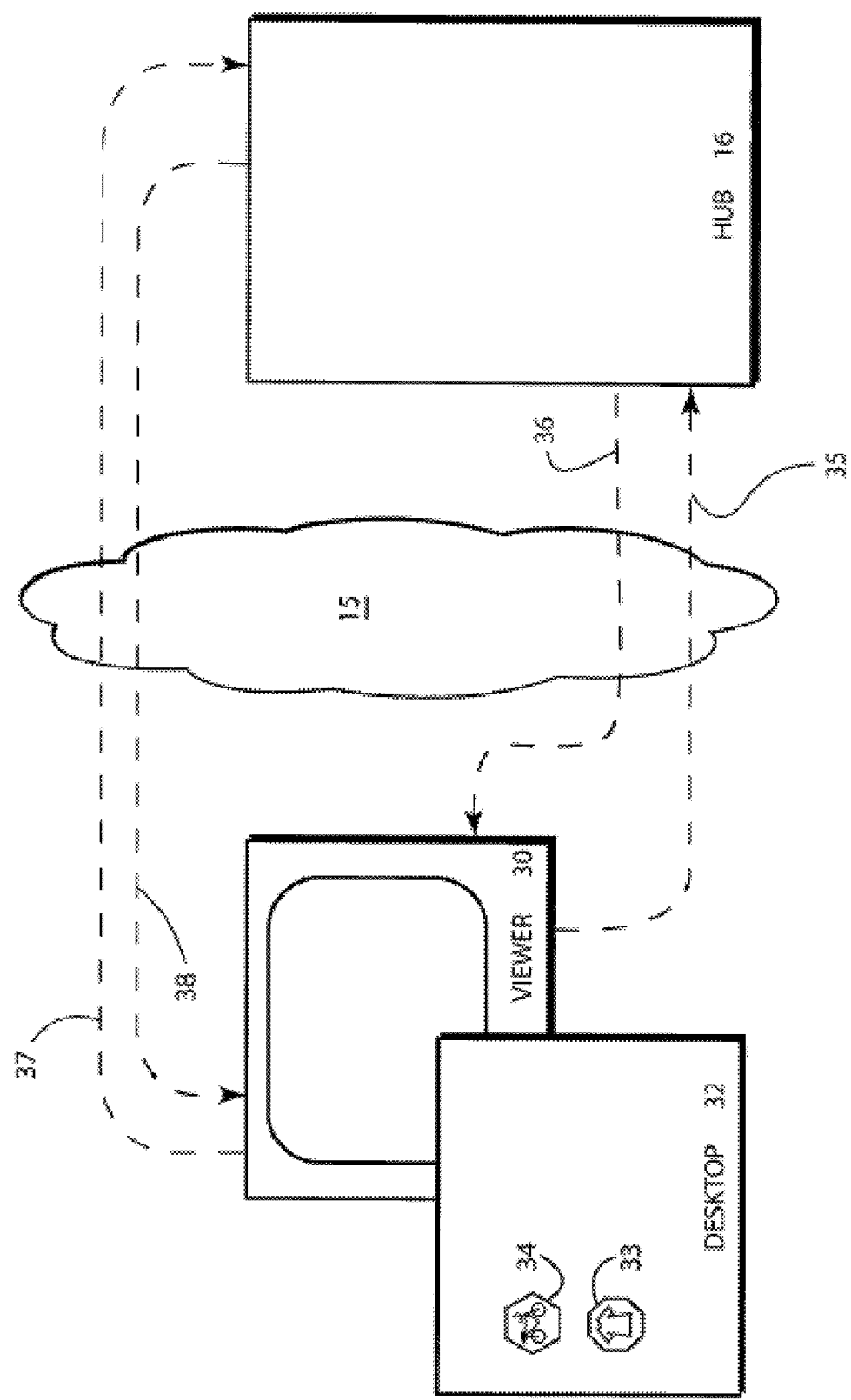
FIG. 4 is an example user desktop and viewer in accordance with an example embodiment of the present invention.

This feature is more particularly shown in FIG. 4 where the subscriber 22 has downloaded to different BeeZip viewer files onto their computer 10 corresponding to two different viewer entities (such as, viewer entities #1 and on #2 on FIG. 3). In this case, one icon is associated with a clothing manufacturer (icon 33) and the other is associated with a motorcycle dealership (icon 34). When the user clicks on icon 33, the kernel/comlets associated with the clothing manufacturer are run from the hard drive appearing to the subscriber as a viewer. The clothing manufacturer kernel will also from time to time coordinate with the hub 16 to receive new clothing manufacturer comlets, as directed by the author 20. When the hub 16 receives a message 35 from the kernel associated with the clothing manufacturer, it knows the identity of the subscriber 22, and the identity of the clothing manufacturer associated with that kernel. At that time (the viewer may or may not be active), the hub 16 returns all of the comlets 17 in a message 36 to the kernel for downloading to the hard drive 18. Then, the next time the subscriber 22 clicks on icon 33, new clothing manufacturer content/program will be ready on the hard drive for execution.

On the other hand, if the user clicks on the icon 34, the kernel associated with the motorcycle manufacturer will run the pre-loaded comlets associated with that manufacturer. Similarly, that kernel will also send, from time to time, message 37 to the hub 16 (also via the Internet 15) identifying the motorcycle dealer associated with icon 34 (as opposed to the clothing manufacturer associated with icon 33) and the subscriber 22 identity. The hub 16 therefore knows the subscriber and the motorcycle dealer and returns message 38 with appropriate comlets to created the viewers 30 associated with the motorcycle manufacturer. The next time the subscriber 22 clicks on icon 34. One can see that a subscriber may load onto their desktop a number of BeeZip icons which will run substantially different viewers 30, depending on the particular icon selected. Thus, the viewer 30 may see rich graphics associated with a clothing catalog if the user selects the clothing icon 33, but may see high quality photographs of motorcycles at a dealership if the user selects the motorcycle icon 34. Further, the viewer itself can be modified to reflect a completely different kind of viewing environment tailored to the motorcycle or clothing content presented. The viewer 30 created by the system is thus completely tailored to the particular content being delivered.

Returning to FIG. 3, one can see that publisher #1 and publisher #2 can have a number of associated authors 20 that communicate with the subscriber 22 (and other subscribers as well). Further, each publisher can place an icon on the subscriber 22 desktop 32, provided the subscriber 22 grants permission for the icon to be placed there (by loading the software via CD, Internet download, etc.). Once the icon is placed, the subscriber 22, the associated author 20, the publisher associated with the author 20, etc. are all identified by the hub 16 as desiring the dedicated channel of communication. The identification of each of the entities associated with a particular icon can be embedded information in the URL request initiated by the computer 10 via the Internet connection 14, such as is presently accomplished using so-called "Cookies."

The hub 16 includes an author-side interface 24 to interact with each of the authors 20 (possibly via an authoring interface 25) and a subscriber side interface to interface with the many subscribers 22.

The authoring interface 25 allows the authors 20 to custom tailor information that will be received by their respective subscribers using the screens shown in FIGS. 10-14 and described below. A control enter 26 coordinates the receipt of instruction from authors 20, delivery of comlets to the data accumulation routine 27, and the creation of comlets from raw material received from the authors 20. The Command Center 26 may alternatively reside on the hub 16 or on the author computers, although it is conceptually and functionally independent of the hub 16 and authors 20. The authoring interface 25 in FIG. 3 also includes a variety of functional routines that assist the client authors in creating the robust messages sent to the subscriber 22 in order to create the viewers. The authoring interface 25 can translate primitive information (simple text, images, music, etc.) into a final presentation to be seen by the subscriber 22. Ordinarily, client authors have neither the time nor the desire to write the program code described above with respect to the comlets 17. Accordingly, the authoring interface 25 translates simple primitive data received from the client author into the robust final information viewed by the subscriber 22 by converting the content received by the client author into the content plus programmable code associated with the comlets 17. Standard routines for taking, for example, text and converting into a robust letter presentation, are pre-programmed as the various translets 1-*n* shown in FIG. 3. In one example, the authoring interface 25 takes the primitive data submitted by the author 20 and lays it into a template that creates a final presentation code that can be employed by the subscriber 22 computer 10 to execute the viewer. Using the author interface 25, very little work is required of the author 20, except to provide the base content to be delivered to the subscriber 22 in the format of the robust presentation desired.

The authoring interface 25 is not limited to receipt and translation of text or images. In the text example embodiment, an author 20 may send raw basic text to the authoring interface 25 for translation into a robust business letter graphic. But the authoring interface 25 is not limited to just text type translations. The authoring interface 25 permits the author 20 to use music, voiceovers, audio, graphics, text, videos, montages, collages, etc. to present the raw data provided by the author 20 in a robust form to the subscriber 22. In each case, the authoring interface 25 accepts the primitive information from the client author 20 (via the Internet, telephone, etc.) and loads it into a template which is then translated into the appropriate program codes to instruct the kernel 12 to render the viewer.

A translet does the following:

1) Converts raw data into appropriate internal formats and sizes. For example, the user may submit a raw image in .bmp format, and the translet may scale, enhance, annotate, and change the image into another format before compiling it into a translet.

2) Creates program code in some instances to deal with the variable input that may be received in the composition phase.

3) Compiles the translated raw data, generated program code, template code, and template media into final comlet.

The command center 26 and Translets can be either web-based applications or traditional computer-local applications. The command center 26 may contain some translets, such as the letter comlet translet (because it is so generic). However, other more specialized translets (like a home tour translet) would be more appropriate outside of the command center 26 because it is very specialized.

The hub 16 is responsible, primarily, for accumulating comlets for delivery to/from the subscriber 22. When the kernel 12 makes a next connection to the hub 16. As previously described, connections are initiated by either the subscriber 22 at the timing desired by the subscriber 22 or at regular events initiated by the kernel 12. Content which the author 20 has instructed the hub 16 to prepare in anticipation of a next access by the kernel 12 is maintained in the data accumulation entity 27, which accumulates information for the subscriber 22.

The example system is substantially better than existing data mining systems because, prior to any substantive interaction with the subscriber 22, the hub 16 learns exactly who the subscriber is and exactly which publisher the subscriber has requested a dialog with. A new subscriber may even be unaware of which author or authors are generating and sending content to him, at least early in the dialog. Likewise, when he generates a reply to the author, he doesn't necessarily know which author or authors might receive his reply.

The data accumulation entity 27, records for the author 20, each instance in which the subscriber 22 initiates contact with the publisher associated with the author 20, the time of such access, the requests made by the subscriber, the downloads provided to the subscriber, replies made by the subscriber, etc. This also permits the hub 16 to accumulate data in the data accumulation entity 27 regarding subscribers that do not access the viewer entity for a pre-determined period of time. Thus, a subscriber 22 who loads a realtor's kernel into their computer and makes an initial connection to the hub 16 can be directly contacted by the author 20 if the hub 16 notifies the author 20 that the subscriber has not communicated with the hub 16 for a period of a certain number of weeks (for example). Thus, the hub 16 is able to accumulate data both on what the subscriber does, and does not do, in association with the hub 16. Further, the hub 16 can automatically provide callups to the authors 20 when the subscriber's owned by the publisher do not hear from the subscriber. In such cases, an author 20 can automatically notify the hub 16 that, after a pre-determined period of inactivity, the subscriber 22 is to receive a custom graphics viewer containing a follow-up letter from the author 20.

In general, because a subscriber may download a kernel from the Internet or obtain it through a mass distribution of CD ROMS, the subscriber must necessarily initially receive generic welcome content from the publisher. However, if the author meets the subscriber before the installation and they agree on a username, then the author can replace generic content with specific content tailored for the subscriber by "pre-registering" the subscriber before the subscriber installs the kernel.

Such interaction between the author 20 and the subscriber 22 (each operating at their own respective pace) is provided as a result of the dedicated channel and robust media presentations enabled by the present invention.

FIGS. 5-9 are example BeeZip viewer screens. As one can see from just a cursory review of these examples, the information presented is substantially more robust than could be provided in an e-mail environment. Further, the viewer's shown in FIGS. 5-9 are each customizable to a publisher such that the viewers can be completely different for one publisher versus another publisher, completely without regard to the applications (including the kernel 12) that reside on the computer 10. FIGS. 5-9 are thus examples to illustrate how the kernel and/or comlets 17 create high resolution messages on a dedicated channel to the subscriber.

Figure 5:
FIGS. 5 through 7 are example embodiments of a viewer in accordance with the present invention.
Figure 6:
Figure 7:
Figure 8:
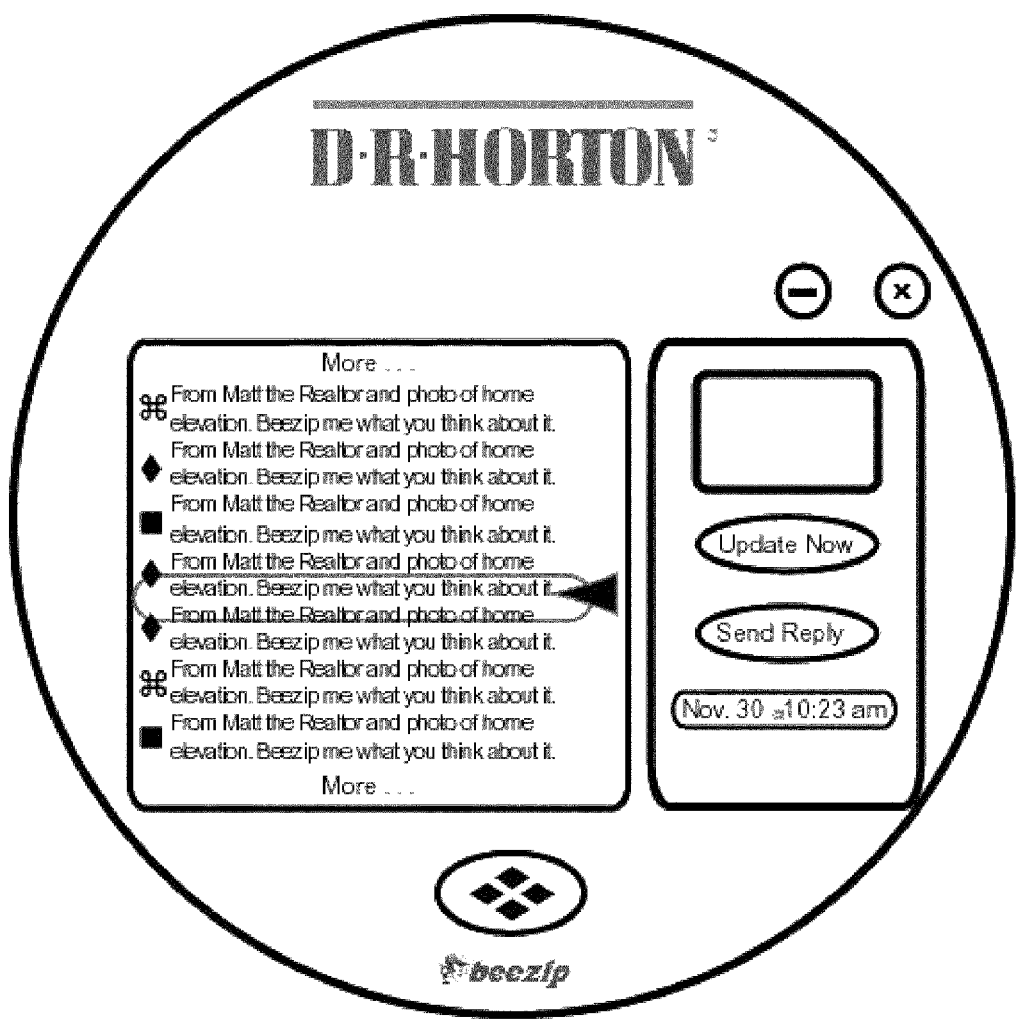
FIG. 8 is an example embodiment of a mailbox at the subscriber station in accordance with an example embodiment of the present invention.
Figure 9:
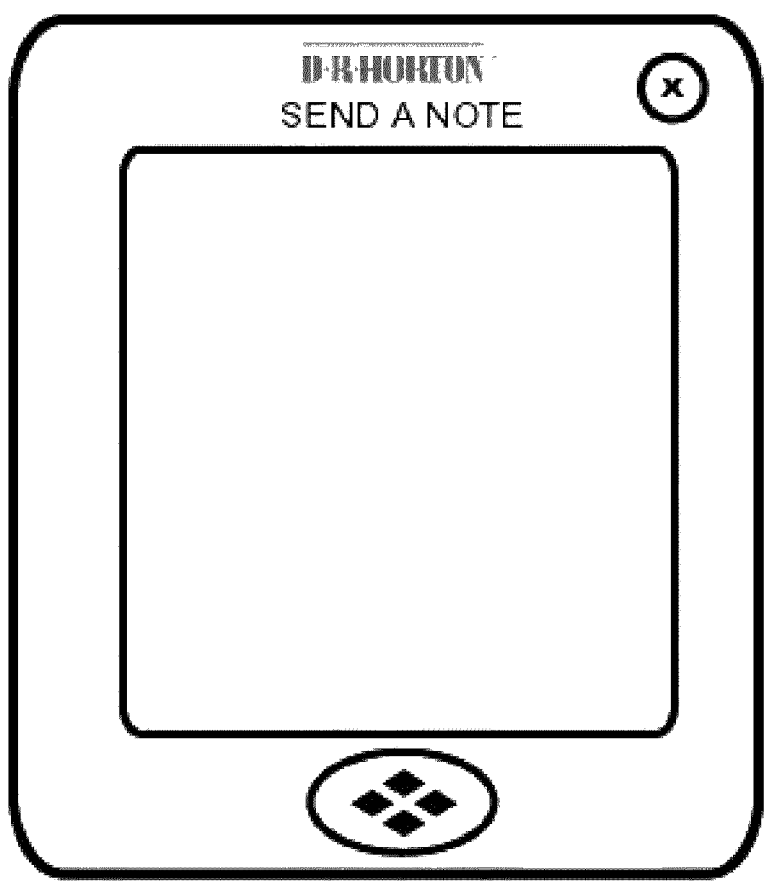
FIG. 9 is a user reply screen at the viewer in accordance with an example embodiment of the present invention.

FIGS. 5 and 9 represent screens that are generated within the kernel; while FIGS. 6-8 are generated by comlets. FIG. 5 is part of the installation process. FIG. 9 represents the generic reply capability built into the viewer. In the examples of FIGS. 6-8, the comlets pretty much stay within the same framework (the round viewer). Although this is perhaps a prescribed friendly behavior for a comlet, a comlet could always break the rules and pretty much draw any presentation that it wants. In a preferred embodiment, the framework (for example, represented by the round viewer) is a default for any kernel/(business/publisher entity). However, this framework could have a completely different appearance (like a stop sign shaped viewer) for a different business/publisher entity. In FIG. 5, an introductory viewer is created when the subscriber first loads the CD, downloads the file, etc., that is has been provided to the subscriber by the publisher or author 20 (the business). In the example of FIG. 5, the subscriber has already downloaded the kernel, has indicated that it is a new BeeZip subscriber, and sends that message to the hub 16. In response, the hub 16 assigns a unique identifier to the subscriber 22 (since this is the first time the subscriber has accessed the hub 16 for this particular viewer entity), records the publisher associated with the subscriber 22 software that was just downloaded (via the CD, Internet download, etc.), and returns comlets 17 associated with the particular viewing entity and client author 20. In the example of FIG. 6, a comlet is being executed from the hard drive by the kernel 12. FIG. 6 is an example original introductory "response" information from a realtor associated with a realtor organization called D.R. Horton.

In this example, the realtor, Sue Morgan, is the "author" 20, and the "publisher" is the employer D.R. Horton. FIG. 6 appeared when the subscriber clicked on the D.R. Horton icon, causing the kernel to read the appropriate FIG. 6 comlet that had previously been received by the computer 10 and stored in the hard drive. To the subscriber, it appears that he has a dedicated communication connection to D.R. Horton via the desktop icon.

As one can see in FIG. 6, the information provided in the comlet 17 associated with FIG. 6 is substantially more impressive than what can be provided in an e-mail communication. Thus, the present invention is dramatically unlike e-mail communication even though each provides dedicated addressing to a recipient. In the example embodiment, the program code that is travelling with the content in the comlet 17 permits the computer 10, in association with the kernel 12, to create beautiful and impressive multimedia marketing presentations and to do so via dedicated channel communication between the hub and the subscriber.

FIG. 7 illustrates an example letter presented to the subscriber 22 from the author 20 via a previously downloaded comlet. As previously described, the information in the letter was first provided to the authoring interface 25 by the author 20 in simple text format. The authoring interface 25 then converted (using a translet) the simple text into the rich graphics seen in FIG. 7 for delivery as comlets to the subscriber 22. The next time the subscriber 22 clicked the appropriate icon, the resident kernel ran with the then resident comlet and created the viewer shown.

FIG. 8 is an example viewer which identifies each of the new messages delivered to the subscriber 22 by the author 20 (sometimes directly and sometimes indirectly) since the last time the kernel 12 accessed the hub 16. For each of the items in FIG. 8, the subscriber can select the item and immediately execute the viewer program code of the associated comlet 17 for the selected messages because the necessary information has already been locally stored at the computer 10.

In the preferred embodiment, the hub 16 can download all comlets associated with all of the content that the subscriber 22 has not seen since it last time it was accessed hub 16. Thus, the data accumulator 27 can download all of the appropriate comlets associated with all of the different viewers that the subscriber 22 has not yet seen immediately upon the subscriber 22 accessing to the hub 16. In such an instance, when the subscriber makes a selection from FIG. 8, the kernel 12 finds the appropriate comlet from the memory of the computer 10, executes the appropriate program code for the selected comlet 17, imposes the content data of the comlet 17, and renders the appropriate viewer as selected.

FIG. 9 illustrates another example viewer that has been created by the kernel 12 for the subscriber 22 to record and send a note back to the associated author 20.

Figure 10:
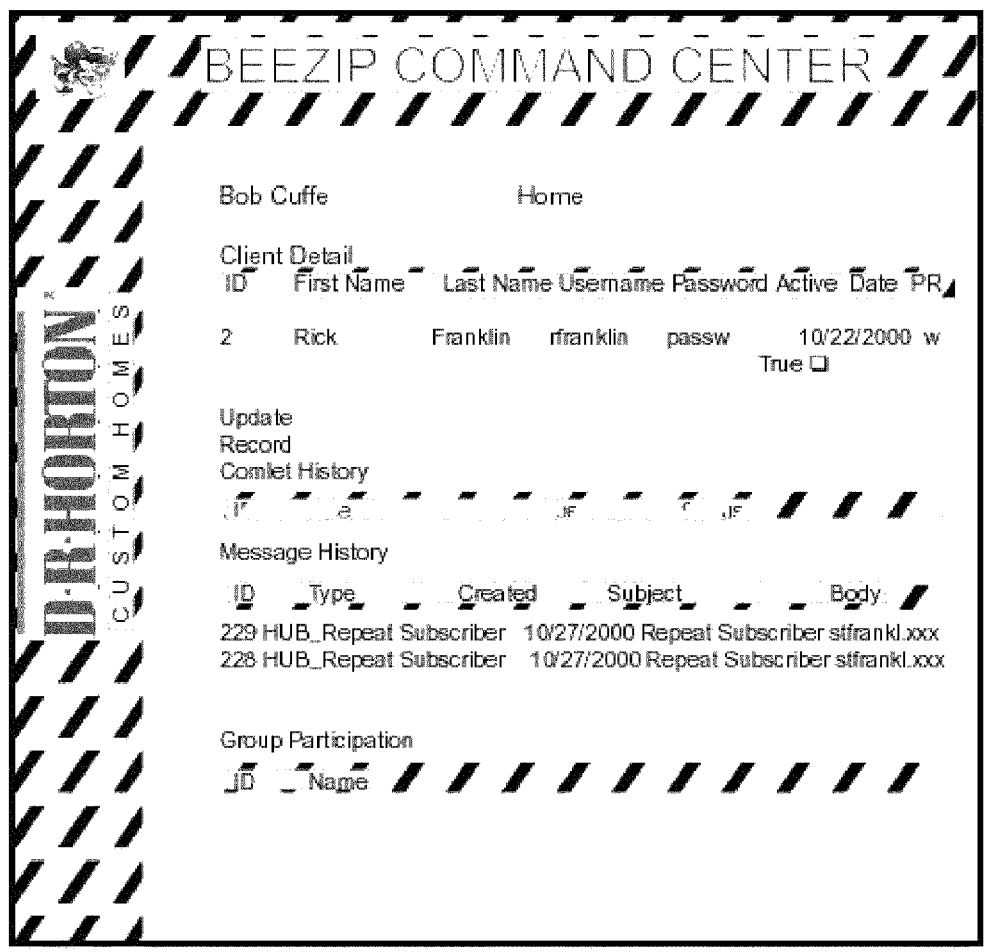
FIG. 10 is an example client command center.
Figure 11:
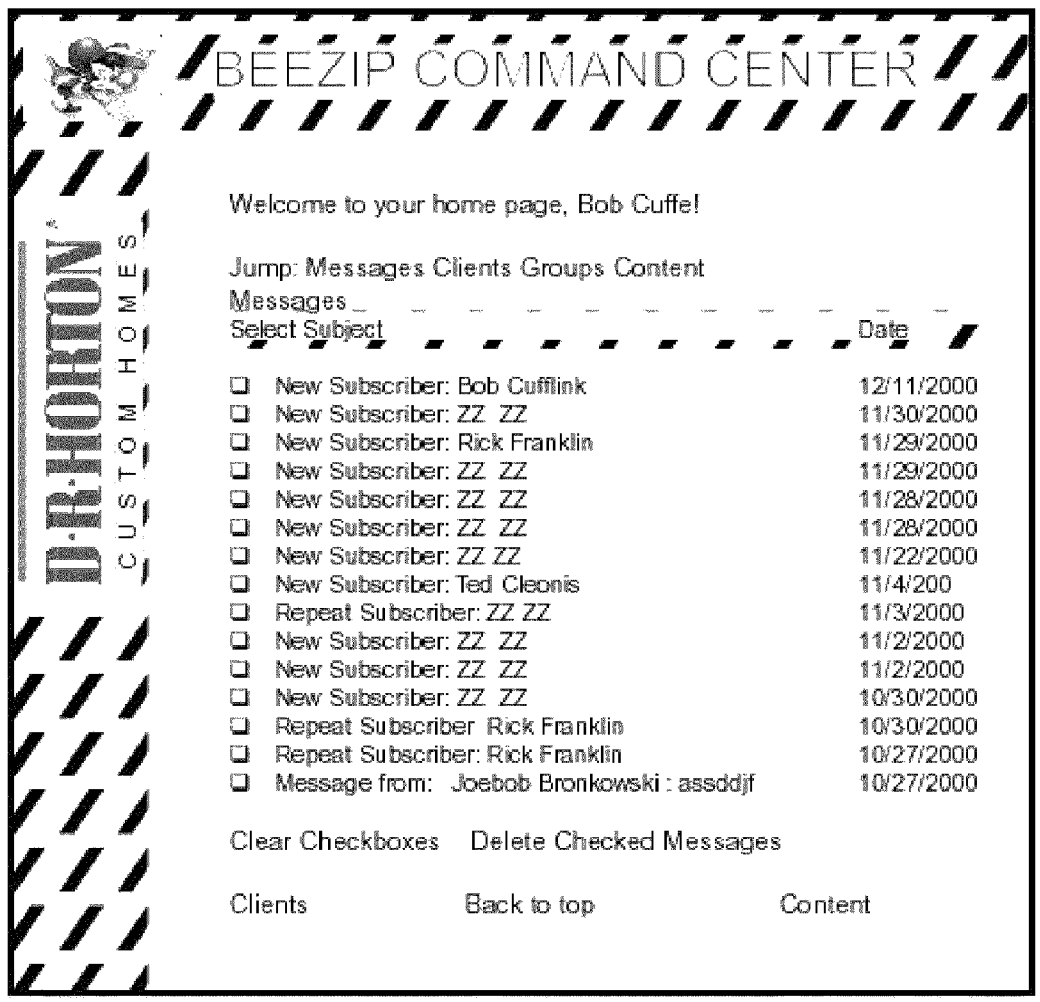
Figure 14:
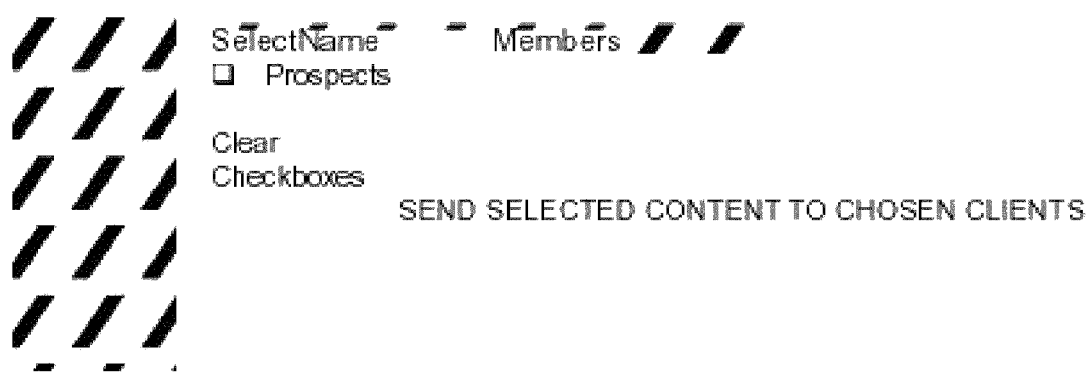

On the subscriber-side of the hub 16, the subscriber-side interface 22 provides information back to the author 20 regarding the activities of the subscribers that are "owned" by the author (or publisher). In FIG. 10, a command center homepage provides a report to an author 20 whenever a kernel at author 20 computer periodically accesses the hub 16. First, one can see that the subscribers (who are "clients" to the author 20) are listed by name and ID in the "client detail" section. In this section, the author 20 can update and record information regarding the subscribers described. In the next section, the comlets prepared by the particular author 20 are listed by title, ID, etc. Messages recorded by the author 20 to the hub 16 are also identified in the message history section. Finally, a group participation section identifies activity associated with groups of subscribers that have been grouped according to the authors' preferences. In FIG. 11, the client command center continues from FIG. 10. Here, messages from each of the subscribers 22 are listed for the author 20. Thus, the first entry records that a new subscriber "Bob Cufflink" accessed the hub on Nov. 16, 2005. Repeat subscribers are also listed together with the date that they accessed the hub 16. Finally, messages from the various subscribers that have been written directly to the author 20 are recorded in FIG. 11. The page on FIG. 11 can be used by the author to select all new subscribers, for example, to deliver a new subscriber welcome viewer (for example, FIG. 6 or FIG. 7).

Figure 12:
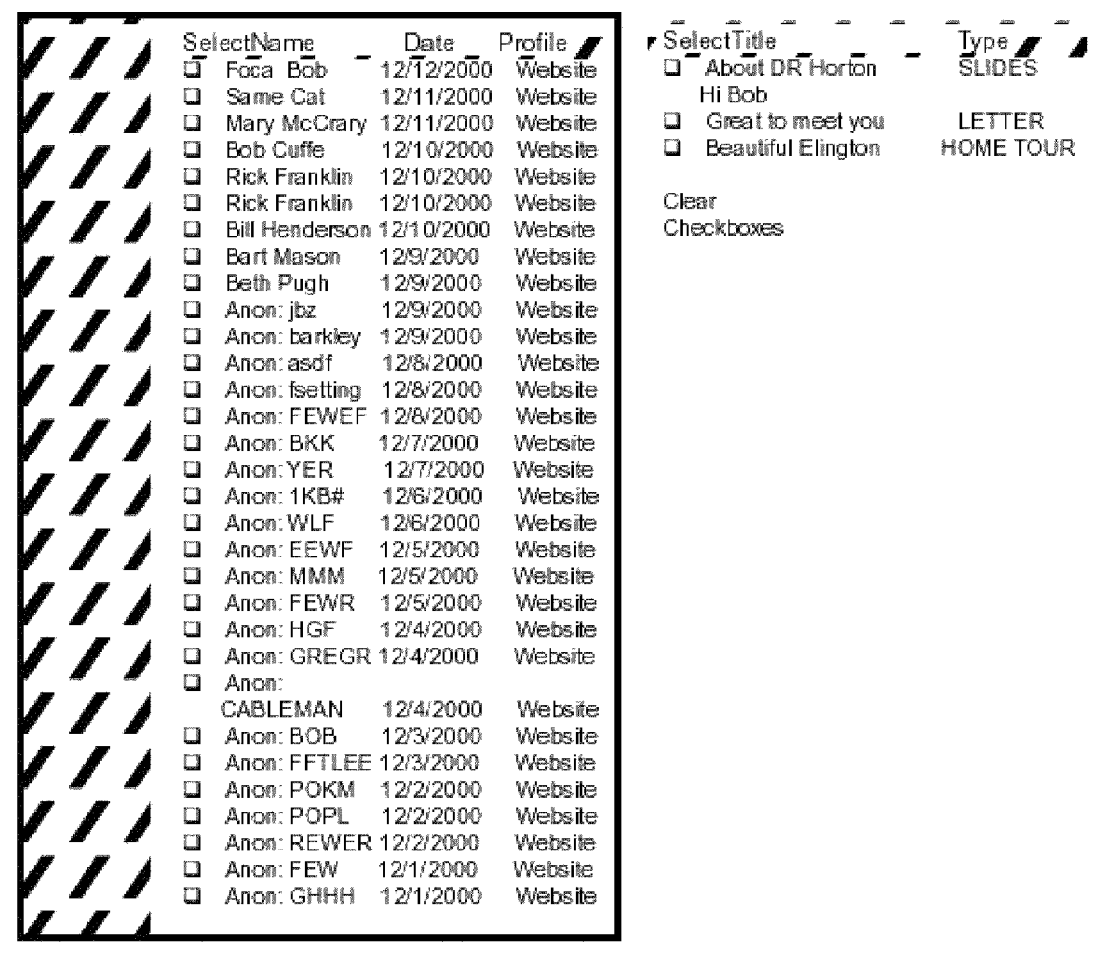

FIG. 12 illustrates the list of subscribers associated with the author 20 and the list of viewers that are presently available to the author for sending to the respective subscribers. Using the page on FIG. 12, the author 20 can quickly checkmark various subscribers "owned" by that author and select comlets to be sent to the respectively selected subscribers. Thus, in FIG. 12, the author may select "foo bar" subscriber to receive the "about D.R. Horton . . . Hi Bob" slides. When the author 20 selects "foo bar" and the "slide presentation," that content (the comlets associated therewith) is loaded into data accumulator 27 for delivery to subscriber "foo bar" the next time that subscriber's kernel accesses the hub 16. Thus, the subscriber gets the impression that the author 20 is in a direct one-to-one dialog with the subscriber, even though the author 20 is actually quickly and easily creating high resolution marketing products for the subscribers via hub 16.

FIG. 13 continues the subscriber list of FIG. 12 and begins (at the bottom of FIG. 13) the "groups" of subscribers that have been arranged according to the preferences of the author 20. The "groups" continue on page 14, with the group identified as "prospects" being listed. The "groups" box operates as a typical group selection facility in which the author 20 can select a larger number of subscribers by simply clicking the group associated with those subscribers.

The combination of a dedicated dialog channel between business and customers, together with the presentation of viewers created by the delivery of both content and executable code such that marketing presentations are substantially more robust, has not been presently seen. This advantageous combination presents a large number of possible environments for use including the following:

Daily Shopping

Companies that offer daily deals found on the Internet admit that the biggest problem they have is their customers' reluctance to log on each day and view the deals. Many have started to implement email systems that inform their customers of a deal in which they might be interested, hoping that the email will not get lost amidst other emails and will be read before the deal expires. With BeeZip, the authors provide a quality presentation of their information through the BeeZip viewer. This would allow the consumer to enjoy high quality presentations typically associated with Web page presentations, yet without having to log onto the Web, or wade through email.

Network Shopping

Internet companies would love to offer their customers the ability to purchase their product without having to stay on-line. With BeeZip, the Internet companies interact with the hub on their schedule and subscribers interact on their own schedule. Further, BeeZip downloads all comlets at one time to the subscriber and thereafter releases the subscriber's computer to execute the comlet code, run the content, and thereby render the data, without intervention by the Internet company servers. This further makes the shopping experience more pleasant for the customer, resulting in greater goodwill for the Internet company.

New Home Sales

Builders and real estate agents can showcase entire lines of homes, both ready-to-occupy and projected buildings. Model homes, rendered drawings, and floor plans can be interactively toured. New home sellers typically have a larger budget, so builders and realtors can produce a glamorous presentation that appeals to a high-dollar market. Individual real estate agents can send newsletters to clients, and can give personalized updates to customers looking for a specific dream home. A mortgage calculator can be another viewer that shows anticipated monthly payments.

Existing Real-Estate Sales

Existing home sales outpace the new home industry by 20 times. Because their inventory line is continuously changing, real estate agents who sell pre-owned homes can take advantage of the auto-composition aspect of BeeZip. They can quickly delete and add to the listing with their own digital camera, and speedily send new listings to interested prospects. Video tours and slide shows of the premises—indoors and out—help customers visualize themselves in that home. Community services, school districting, covenants, and restrictions can all be accessed by interested prospects.

Product Sales

Business-to-business and business-to-customer relationships can be strengthened by a personal, secure, private form of communication. Customers can be alerted to new lines and models of products and sales staff can offer pre-announcement previews without alerting their competition. Preferred customer discounts encourage buyer loyalty; interactive ads permit customers to "try on" a product before purchasing and learn more than a paper ad or email allows. Businesses working with distributors can plan sales promotions and track progress as well as highlight a products' selling points. Questions about product features can be asked with confidentiality and speed.

Newsletters

Businesses, organizations and other entities can send communications in multiple formats, customized to the specific needs of each recipient. Feedback can be instantaneous; networking and planning can be shared with selected members.

Fan Clubs

A music company could deliver the BeeZip viewer on a music CD. This could be used as a way for the music company or artist to communicate directly with their fans. They could send letters, music clips of soon-to-be-released music, or even full-length music videos. This method also allows the consumer to purchase products associated with the artist.

Further, sports teams, rock stars, Hollywood actors, pet breeds, and automobiles all have intensely loyal followings. With a BeeZip icon on their desktop, these fans can be the first to learn about upcoming appearances, developments, and new products. Distributors will enjoy a higher profit by not having to market fan merchandise through traditional retail outlets. Knowing when their favorite team or performer is coming to town will increase ticket sales. Newsletters can offer background information unavailable elsewhere. In the case of performing musicians, offering the BeeZip viewer on a retail CD will allow the link to be established and continue indefinitely.

Family Photos and Information

The miles between family members can feel diminished by establishing an ongoing family reunion with BEE-Zip. Family genealogy and snapshots of new babies and weddings can be shared; upcoming travel plans can be coordinated and letter-writing can be pipe-lined to multiple family members.

Movie Theatres and Video Rentals

BeeZip can provide clips of coming attractions on the desktop to entice movie fans to the theatres. Automatic video reservations assure the fans that their desired selection will be available at the video rental store, by responding to the BEE-Zip advertising comlet. By offering frequent shopper incentives and printable discounts through BeeZip, movie buffs have an incentive to keep going back. Cinema distributors spend millions to advertise their latest features. Offering a three-minute snippet on a customer's computer desktop is a focused welcome presentation.

Financial Services

A periodic update from an accountant, a hot tip from the stock broker, and an alert of upcoming maturity for investments will keep clients in the loop on where their money is going and how to keep more of it for themselves. Offering strategies aimed at particular customers' needs helps professionals increase loyalty and commissions, yet also results in satisfied clients.

Restaurants

Preferred customer discounts and a listing of specialties and promotions increases traffic through the door. Patrons with food sensitivities or special needs can contact the chef to ask for special consideration or request a list of ingredients before trying a new item.

Schools

Teachers can post class assignments or initiate private conferences with individual parents. School staff can send targeted announcements to specific families—from sports practice schedules, to academic competitions, to the availability of tutoring. The school's handbook and code of conduct can be posted for consultation by parents and students; cafeteria menus and activity calendars can be sent, and because BeeZip is private and confidential, phone numbers and addresses can be shared with recipients. Even the administration and board of education can participate by posting meeting transcripts, newsletters, and contact information.

Interactive Auctions and Collectibles

Buyers and sellers can connect to buy, sell and swap with a new level of convenience. Seekers can post a query for their desired items and be notified when it's put on the auction block. Confidentiality is assured and a high-quality preview of the item for sale is possible with BeeZip. Buyers can examine items for quality and general appropriateness before submitting a bid. Credit card processing and order tracking allow the entire process to take place in front of a computer screen. Note, however, that BeeZip, because of its offline nature, may not be real-time enough to be an effective auction bidding system. Although it may be great for letting people know about stuff that will be displayed on auction. The author or subscriber can also post "desired items" and have them download without having to actively get on the Internet.

Market Research and Customer Surveys

Many Americans participate in opinion polls and market preference research. BeeZip allows the pollster to select survey candidates that fit a certain criteria and organize the research question and data. Responding to surveys and research is easier for the individual client. Interactive displays allow a client to experience the product before offering his opinion.

Non-Profits and Political Parties

Anyone promoting a cause, concern or candidate knows that the best source of donations is established supporters. Supporters who install BeeZip on the their desktop invite ongoing communication about their favorite projects and will respond with support, donations, and votes. Political platforms, rallies and fund-raisers can be announced and targeted to those most likely to respond.

Medical Services

The family doctor or dentist, a plastic surgeon and an outpatient surgery client can all use BeeZip to establish a private dialogue with patients. Those requiring monitoring of ongoing conditions can file reports from home that are monitored by professionals in the office. Questions on upcoming procedures can be asked in confidence, background information on various condition can be obtained, and billing records can be accessed. Video presentations can educate patients on conditions and procedures.

Lawn Care

Reviewing landscaping options, scheduling mowing services, and monitoring weather conditions can be done through BeeZip to streamline operations and keep customers informed and happy.

Rising Stars

Being able to produce and promote oneself helps a singer, actor or athlete convince agents and executives. Audio and video clips can showcase skill, and the multi-media personalized presentation format demonstrates to potential supporters a sophistication and commitment to technology. BeeZip provides an updated, superior alternative to sending in a demo CD or video because it improves the future interaction and dialogue with the prospect.

Employment Services

Prospective employers and employ can view photos, resumes, company profiles and salary packages before scheduling an interview. A company seeking a particular type of employee needs only to specify the criteria and the employment agency will BeeZip a file of likely candidates. Job seekers can hone in on likely companies across the country, inquire about policies and compensation, and determine if the fit is likely to be a good one.

Other Applications/Uses

The above are just examples of potential uses of the BeeZip technology that benefit from combination of the private dialogue with robust presentations achieved by the present invention. Many, many other applications will also be seen and understood by the artisan once the above description of the present invention is read and understood.

Example Translet

Although many different kinds of translets are envisioned within the scope of the present invention, one example translet will integrate with both a phone and Palm Pilot type PIMS to create voice annotation for comlets. The way it will work (from the user's perspective) is given below. The author first creates some type of comlet with a primary translet application. The primary translet could create a welcome screen comlet, a letter comlet, business card comlet, collage comlet, etc. The translet presented to the author has a checkbox next to the submit button called "add voice annotation." In a first embodiment, when the author presses the submit button, the translet asks the author to record a message as a voice recorded PIM and place the PIM in a caddy attached to the authors' computer. The translet then detects the new message, adds it to the comlet, and then sends the comlet to the hub for distribution.

In an alternative embodiment, when the author presses the submit button, the translet immediately sends a comlet to the hub without any voice annotation. When the hub receives the comlet marked for telephone annotation, it rings the phone number of the author via a voice modem bank connected to the hub, and asks the author to record his message. When the author hangs up, the annotation is added to the comlet and then queued for distribution.

While the invention has been described in connection with what is presently considered to be the most practical and preferred embodiments it is to be understood that the invention is not to be limited to the disclosed embodiments but on the contrary, is intended to cover various modifications and equivalent arrangements included within the spirit and scope of the appended claims.

What is claimed is:

1. A client running an operating system executing on a communication application provided by a server, said client comprising:

a memory, said memory including a client application comprising a first executable code providing a kernel having core functions and having data functions for establishing a communications link with said server and receiving said communication application provided by said server; and a computing device, said computing device receiving said communication application from said server, said communication application including a partial executable code and a data, said partial executable code defining a presentation environment tailored for executing on said data, said presentation environment determining how said data is used by said client application regardless of the format of the data, said partial executable code completing said core functions to create said presentation environment thereby fully enabling said client application to execute on said data independent of any other data and any other partial executable code included in any other communication application provided by said server, said core functions having no understanding of the format of said data or of said presentation environment, said partial executable code requiring said core functions provided by said first executable code to create said presentation environment.

2. The client of claim 1, wherein said data comprises at least one of a graphic, a photograph, an e-mail, a music, a voice message, a video, an interactive program, or a media.

3. The client of claim 1, wherein said kernel is provided to said client by one of a compact disk, a digital video disk, a floppy disk, an e-mail, or a web site location.

4. The client of claim 1, wherein said client comprises a desktop computer.

5. The client of claim 1, wherein said communication application corresponds to a relationship between a first person and a second person.

6. A client running an operating system executing on a plurality of communication applications provided by a server, said client comprising:
   a memory, said memory including a client application comprising a first executable code providing a kernel having core functions and having data functions for establishing a communications link with said server and receiving said communication application provided by said server; and
   a computing device, said computing device receiving a plurality of communication applications from said server, each one of said plurality of communication applications comprising one of a plurality of data and a corresponding one of a plurality of partial executable code, said one of said plurality of partial executable code defining a presentation environment tailored for executing on said corresponding one of said plurality of data, said presentation environment determining how said corresponding one of said plurality of data is used by said client application regardless of the format of the corresponding one of said plurality of data, said one of said plurality of partial executable code tailoring said core functions to create said presentation environment thereby enabling said client application to execute on said one of said plurality of data independent of any other one of said plurality of partial executable code included in any other communication application provided by said server, said core functions having no understanding of the format of said one of said plurality of data or of said presentation environment, said one of said plurality of partial executable code requiring said core functions provided by said first executable code to create said presentation environment.

7. The client of claim 6, wherein said one of said plurality of data comprises at least one of a graphic, a photograph, an e-mail, a music, a voice message, a video, an interactive program, or a media.

8. The client of claim 6, wherein said kernel is provided to said client by one of a compact disk, a digital video disk, a floppy disk, an e-mail, or a web site location.

9. The client of claim 6, wherein said client comprises a desktop computer.

10. The client of claim 6, wherein each one of said plurality of communication applications corresponds to at least one relationship between at least one first person and at least one second person.

11. A method of conveying data from a first person to a second person, said method comprising the steps of:
   a. providing said second person a client application comprising a first executable code providing a kernel having a core functions and having data functions for establishing a communications link with said first person and receiving a communication application provided by said first person; and
   b. providing to said second person said communication application, said communication application corresponding to a relationship between said first person and said second person, said communication application including a partial executable code and said data, said partial executable code defining a presentation environment tailored for executing on said data, said presentation environment determining how said data is used by said client application regardless of the format of the data, said partial executable code completing said core functions to create said presentation environment thereby fully enabling said client application to execute on said data independent of any other data and any other partial executable code included in any other communication application to thereby convey said data to said second person, said core functions having no understanding of the format of said data or of said presentation environment, said partial executable code requiring said core functions provided by said first executable code to create said presentation environment.

12. The method of claim 11, wherein said relationship comprises a business-to-customer relationship, wherein said first person is associated with a business and said second person comprises a customer of said business.

13. The method of claim 12, wherein said business comprises at least one of a daily shopping business, an internet based business, a building business, a real estate business, a product sales business, a movie theater business, a rental business, a financial services business, a restaurant, an auction business, a collectibles business, a lawn care business.

14. The method of claim 11, wherein said relationship comprises a business-to-business relationship, wherein said first person is associated with a first business and said second person is associated with a second business.

15. The method of claim 11, wherein said communication application comprises one of a newsletter, a family genealogy, a family photo, an advertisement, a survey, a solicitation for funds, a solicitation for political support, market research, an interactive display, a school handbook, a preferred customer discount, a listing of specialties, a promotion, a class assignment, a menu, a calendar, a phone number, an address, a meeting transcript, contact information, or a billing record.

16. The method of claim 11, wherein one of said first person or said second person comprises one of a doctor, a dentist, a surgeon, a singer, an actor, an athlete, a prospective employee, or a prospective employer.

17. The method of claim 11, wherein said kernel executes on a personal computer.

* * * * *